(12) United States Patent
Ivanov (10) Patent No.: US 9,074,310 B2
(45) Date of Patent: Jul. 7, 2015

(54) CAPACITATIVE SENSOR DEVICE (75) Inventor: Artem Ivanov, Gilching (DE)

(73) Assignee: IDENT TECHNOLOGY AG, Wessling (DE)

( * ) Notice: Subject to any disclaimer, the term of this patent is extended or adjusted under 35 U.S.C. 154(b) by 830 days.

(21) Appl. No.: 12/529,414

(22) PCT Filed: Jul. 3, 2009

(86) PCT No.: PCT/EP2009/058465
§ 371 (c)(1),
(2), (4) Date: May 12, 2010

(87) PCT Pub. No.: WO2010/000861
PCT Pub. Date: Jan. 7, 2010

(65) Prior Publication Data
US 2011/0241700 A1 Oct. 6, 2011

(30) Foreign Application Priority Data

Jul. 4, 2008 (DE) .......................... 10-2008-031-744
Jul. 4, 2008 (DE) .......................... 10-2008-031-774

(51) Int. Cl.
*G01R 31/08* (2006.01)
*G01R 19/00* (2006.01)
(Continued)

(52) U.S. Cl.
CPC ................ *D06F 39/003* (2013.01); *G01D 5/24* (2013.01); *G01P 3/48* (2013.01); *G01P 3/483* (2013.01)

(58) Field of Classification Search
CPC ......... D06F 39/003; G01P 3/48; G01P 3/483; G01D 5/24
USPC .............. 324/629, 658–690, 520, 76.11, 166, 324/76.19, 167, 519, 750.17, 754.28; 73/79, 648, 335.04, 74, 780, 862.337, 73/862.626, 514.32
See application file for complete search history.

(56) References Cited

U.S. PATENT DOCUMENTS 4,885,491 A * 12/1989 Hiyama et al. ................ 310/90.5
5,631,556 A   5/1997 Shibata ......................... 324/174
(Continued)

FOREIGN PATENT DOCUMENTS

DE   19523322 A1   1/1997   ............. G01D 11/24
DE   19854959 A1   5/2000   ................ G01L 3/10
(Continued)

OTHER PUBLICATIONS

International Search Report and Written Opinion, Application No. PCT/EP2009/058465, 10 pages, Sep. 4, 2009.

*Primary Examiner* — Jermele M Hollington
*Assistant Examiner* — Farhana Hoque
(74) *Attorney, Agent, or Firm* — Slayden Grubert Beard PLLC (57) ABSTRACT

A capacitive sensor device is provided, especially for determining a rotational frequency of a rotary body, for example of a washing drum and for detecting the amount and/or of the humidity grade of a laundry situated in the washing drum.
The sensor device comprises a first electrode device for the irradiation of an alternating electric field, a second electrode device, into which the alternating electric field irradiated by the first electrode device can be coupled, and an evaluation circuit, which is coupled with the first electrode device and which is formed to generate the alternating electric field irradiated at the first electrode device, for detecting field-electrical interactions on at least one of the two electrode devices. The second electrode device preferably comprises a modulator for modulating the alternating electric field irradiated by the first electrode device.

25 Claims, 4 Drawing Sheets

(51) Int. Cl.
*D06F 39/00* (2006.01)
*G01D 5/24* (2006.01)
*G01P 3/48* (2006.01)
*G01P 3/483* (2006.01)

(56) References Cited

U.S. PATENT DOCUMENTS

| | | | | |
|---|---|---|---|---|
| 5,894,091 A | * | 4/1999 | Kubota | 73/504.12 |
| 7,328,616 B2 | * | 2/2008 | Won et al. | 73/504.08 |
| 2006/0146120 A1 | * | 7/2006 | Joichi et al. | 347/238 |
| 2008/0180029 A1 | * | 7/2008 | Hergenhan et al. | 315/111.21 |
| 2009/0272003 A1 | * | 11/2009 | Dalton et al. | 34/329 |
| 2011/0012584 A1 | | 1/2011 | Ivanov et al. | |

FOREIGN PATENT DOCUMENTS

| | | | | |
|---|---|---|---|---|
| EP | 1033578 A2 | 9/2000 | | G01P 13/04 |
| EP | 1441056 A | 7/2004 | | D06F 39/00 |
| EP | 1785732 A1 | 5/2007 | | G01D 5/241 |
| EP | 2090689 A1 | 8/2009 | | D06F 39/00 |
| JP | 2005061964 A | 3/2005 | | B62D 5/04 |

\* cited by examiner

View from the inside outwards

Side view

Fig. 3

View from the inside outwards

Fig. 4

CAPACITATIVE SENSOR DEVICE

CROSS REFERENCE TO RELATED APPLICATIONS

This application is the U.S. national phase of PCT application PCT/EP2009/058465, filed 3 Jul. 2009 and claiming the priority of German patent application 102008031744.6 itself filed 4Jul. 2008 and German patent application 1-2--9-31774.8 itself filed 4 Jul. 2008, whose entire disclosures are herewith incorporated by reference.

FIELD OF THE INVENTION

The invention relates to a capacitive sensor device. Especially the invention concerns a capacitive sensor device for determining a rotational frequency of a rotary body. Especially the invention is related to a sensor device for determining the rotational frequency of a drum in a dryer or a washing machine. The invention also relates to a capacitive sensor device for a dryer or a washing machine with a drum for detecting the amount and/or the humidity grade of the laundry situated in the drum and/or the drum turn or the rotational frequency of the drum.

STATE OF THE ART

In many areas the rotation and/or the rotational frequency of rotary bodies must be detected or supervised. For example the rotation of the drum in a dryer or a washing machine must be detected in order to, in the event of a break of the belt which drives the drum, prevent an ignition of the dry laundry or an idle running of the drive.

It is also desirable, to optimize the drying process in a dryer as to the needed time and the energy consumption. This requires knowledge of the amount of the wet laundry or the water contained in the laundry.

From prior art it is known, through mostly elaborate and fault-prone direct or indirect measurements on the motor driving a rotary body, to detect the rotation or the rotational frequency of the rotary body, for example of the drum in a dryer. For example the load on the motor is measured, which must have a determined value in order to detect a rotation of the drum (also in the empty state). If the motor driving the drum or the belt moves without load, e.g. in neutral, this can be seen as an evidence that the drum in the dryer is no longer driven.

For determining the humidity grade of wet laundry in a dryer special water level sensors are used in association with a software evaluation. Here the disadvantage is that the water level sensors must be arranged inside the drum or that the water level sensors are in direct contact with the wet laundry situated in the drum.

It is also known to measure the load on the motor and, based on the load change, draw conclusions on the humidity degree of the laundry, since the water content in the laundry decreases with increasing drying duration and with it also the weight of the laundry decreases, which in turn leads to a reduction of the load on the motor. This method however substantially presents the same disadvantages as in the rotational frequency measure.

For determining the amount of wet laundry in a drum it is known from prior art to determine the weight of the laundry situated in the washing drum. From the weight conclusions can be drawn also on the water content contained in the laundry. This method especially has the disadvantage, that the dead weight of the laundry, for example a heavy jacket, is not considered. In order to evade this disadvantage, it is known from prior art to lengthen the drying time, in order to guarantee the safe drying of the laundry. This entails that in certain conditions the drying process lasts longer than necessary, which means at the same time also a higher energy consumption.

OBJECT OF THE INVENTION

The invention is based on the object to provide a solution which makes possible to determine operating parameters of a dryer or a washing machine. With the solution to be provided especially the rotation and/or the rotational frequency of a rotary body is to be ascertainable in a simple way, for example of a drum of a dryer or a washing machine, without falling back on the inexact and fault-prone concepts. Also the determination of the amount and/or of the humidity grade of the laundry situated in a washing drum is to be made possible with constructively simple means.

SOLUTION ACCORDING TO THE INVENTION

This object is achieved according to the invention by a sensor device for determining the rotational frequency of a rotary body, with
 a first electrode device arranged on the rotary body (of the so-called server electrode of a ZPS server; details for the ZPS server see below in the description for FIG. 1 and FIG. 2),
 a second electrode device arranged on the rotary body and an evaluation circuit for detecting the electric field interactions, which serve as a basis for the determination of the rotational frequency of the rotary body, with at least one of the two electrode devices, in which the first electrode device may be operated as a transmission electrode, for coupling an electric field in at least that area of the rotary body in which the second electrode device is arranged.

The evaluation circuit of the sensor device may be connected with the first electrode device and may generate the electric field which is irradiated by means of an electrode of the first electrode device. Moreover the electric field modulated by the second electrode device may be conducted to an evaluation unit of the evaluation circuit. The evaluation unit may evaluate the modulated electric field or alternating field led to it, in order to determine, based on the modulation of the electric field, the rotational frequency of the drum of a dryer. In doing so the first electrode device is additionally operable as a receiving electrode. With the sensor device according to the invention, besides the rotational frequency of a washing drum, also the rotational frequency of other rotary bodies may be determined, for example a vehicle wheel or similar.

In a preferred embodiment the second electrode device may include an electrode which is arranged preferably asymmetrically as to the rotation axis of the rotary body.

The electric field which is generated and irradiated by the first electrode device may be frequency-modulated with the rotational frequency of the rotary body, in which the rotational frequency of the rotary body may be derived from the frequency-modulated electric field.

In a further embodiment of the sensor device the second electrode device comprises a first electrode and a second electrode, in which the first electrode is arranged in the area of the first electrode device and in which the second electrode is arranged preferably in the outer area of the rotary body.

The second electrode device or the first electrode and the second electrode may be coupled to a client circuit, which is power supplied with the electric field coupled by the first electrode device. The second electrode device may be coupled to the client circuit in a capacitive way. The client circuit as such may generate signals that may be modified for example because of a change of the capacitive coupling of the second electrode as to mass. A signal feedback of the changes detected by the client circuit of a capacitive coupling to mass to the evaluation circuit is may take place by means of the first electrode device. The signal feedback to the first electrode device may take place especially by load modulation or impedance modulation in the area of the first electrode device.

The electric field may be amplitude-modulated in this respect with the rotational frequency of the rotary body, whereby the rotational frequency of the rotary body may be derived from the amplitude-modulated electric field.

Several second electrode devices arranged on the rotary body (or on several rotary bodies) are formed preferably in such a way that they are distinguishable by the evaluation unit. This may take place for example with the help of a Fourier transform, preferably in the evaluation unit.

It is particularly advantageous to connect the first electrode device with a stationary, preferably metallic rotation axis of the rotary body. The rotation axis acts here as an electrode.

The rotary body may be a drum of a dryer or a washing machine. Moreover the rotary body may also include at least one support roll for a drum of a dryer or a washing machine, in which the rotation or the rotational frequency of the drum may be derived from the rotation or the rotational frequency of the support roll.

In case of a dryer or a washing machine with a drum, in which the drum is mounted on at least one rotatable mounting support roll, and with a sensor device according to the invention for determining the rotational frequency of the drum, based on the capacitive coupling of the second electrode device arranged on the support roll with the drum, the rotational frequency of the drum may be determined, in which the first electrode device may be connected with the stationary, preferably the metallic rotation axis of the support roll.

The invention also provides a method of determining the rotational frequency of a rotary body, in which by a first electrode device an electric field is generated, in which the electric field is coupled into a second electrode device, in which the coupled field is modulated by the second electrode device, and in which the rotational frequency of the rotary body is deduced from the modulated electric field by an evaluation unit, which is coupled with the first electrode device.

The invention also provides a sensor device for a dryer, in which the sensor device comprises:

a circuit for producing an electric field, which may be radiated on at least one electrode coupled with the circuit, and an evaluation circuit for detecting field-electric interactions between the at least one electrode and a counter-electrode, whereby the electrode is arranged in the area of the drum and isolated from the drum and in which the detected field-electrical interactions are characteristic for the amount and/or the humidity degree of the laundry situated in the drum.

The counter-electrode may be arranged inside the drum and the electrode may be arranged outside the drum, so that in a rotation of the drum the counter-electrode passes at the electrode.

The special advantage of the sensor device consists in the fact that by exploiting field-electrical interactions or capacitance variations between the electrode and a counter-electrode, the humidity degree of the laundry situated in the drum of a dryer may be determined particularly well. Additionally with the sensor device according to the invention also the amount of the laundry is ascertainable. Another advantage consists in the fact that the energy efficiency of a dryer may be improved or the energy consumption may be considerably decreased. Moreover the sensor device does not have to be in direct contact with the laundry in order to determine the humidity degree of the laundry or the laundry amount.

Moreover the field-electrical interactions detected by the evaluation circuit are also characteristic for the drum rotation. In this way it is possible to ascertain in a simple way if the drum is moving or not. In doing so according to the invention also the direction of rotation and/or the rotational frequency may be detected.

Preferably the circuit comprises a freewheeling LC-oscillator for the generation of the electric field or of the electrode voltage at the electrode coupled with the circuit.

The LC oscillator may be formed by a serial LC oscillation circuit, in which the electrode is part of the capacity of the oscillation circuit. In this way also the necessary increase of the electrode voltage on the electrode is reached.

The circuit may be used as server circuit, in which the electrode serves as server electrode. In this way additionally other events in the washing drum may be detected.

The sensor device is formed in such a way that the rotation of the drum causes a change in the capacitive environment of the electrode, which causes a frequency modulation of the oscillator frequency of the circuit. From the frequency-modulated oscillator frequency the rotation of the drum and/or the humidity degree of the laundry and/or the amount of the laundry into the drum may be deduced or determined.

In a preferred embodiment the electrode is arranged asymmetrically as to the vertical axis in the drum. In this way it is also possible to determine the direction of rotation of the drum, if (wet) laundry is in the drum.

The direction of rotation may however also be known, so that with the aid of the direction of rotation from the frequency-modulated signals the amount of the laundry or the humidity degree of the laundry may be determined.

Two similar frequency-modulated signals as for both direction of rotations of the drum are characteristic for a full loaded drum. This may be deduced from the fact that the capacitive environment of the electrode in a drum rotation changes very little or not at all when the drum is fully loaded, since in the drum there is not sufficient space for the motion of the laundry in the drum.

The electrode may also be formed in such a way, that the direction of rotation of the drum may be ascertained also without (wet) laundry in the drum. For example the electrode may even have an asymmetric form as to its own axis or the electrode may be formed asymmetric as for the direction of rotation of the drum (cf. FIG. 4).

Also the counter-electrode may present an asymmetric form. The form of the counter-electrode may be formed also asymmetric as for the direction of rotation of the drum.

The at least one counter-electrode may be arranged on at least one of the lifters of the drum, in which the counter-electrode is arranged preferably at the side facing the electrode on the lifter.

In a particular embodiment of the invention the at least one counter-electrode may be formed by at least one lifter the drum. Particularly advantageous in this embodiment is the fact that in the drum no additional means or instruments for the operation of the sensor device according to the invention have to be provided. This allows a particularly economic installation with a low cost of the sensor device according to the invention in a commercial dryer.

In a further embodiment the counter-electrode is formed by the laundry itself.

In a further aspect of the invention it deals with a method of determining the rotation of a dryer drum and/or the amount and/or of the degree of humidity of the laundry in a washing drum, in which the method at least comprises one of the following steps:
1) Rotating the drum clockwise;
  1.1) Detecting the relative changes of the signal using the sensor device according to the invention; and/or
  1.2) Detecting the absolute changes of the signal relative to a reference signal determined before using the sensor device according to the invention;
2) Rotating the drum counter-clockwise direction;
  2.1) Detecting the relative changes of the signal using the sensor device according to the invention; and/or
  2.2) Detecting the absolute changes of the signal relative to a reference signal determined before using the sensor device according to the invention;
  2.3) Comparison of the results detected in the steps 2.1) and/or 2.2) with the results detected in the steps 1.1) and/or 1.2);
3) Detecting the rotation of the drum and/or the amount of the laundry and/or the degree of humidity of the laundry.

The method according to the invention may comprise a step for the determination of a reference signal, which is characteristic for a drum motion in the empty state. This reference signal may be saved in the sensor device, preferably in the server circuit, particularly preferably in the evaluation circuit. For this purpose the sensor device, the server circuit or the evaluation circuit may provide an (additional) non-volatile memory. Both a reference signal for a clockwise rotation and for a counter-clockwise rotation may be determined and saved. The reference signals as to both direction of rotations in case of empty drum differ especially if the electrode is asymmetric as to its own axis.

There is also provided a sensor device, comprising a first electrode device for the irradiation of an alternating electric field, a second electrode device, into which the alternating electric field irradiated by the first electrode device may be coupled, and an evaluation circuit, which is coupled with the first electrode device and which is formed in order to generate the alternating electric field irradiated at the first electrode device, for detecting field-electrical interactions on at least one of the two electrode devices. In case of appropriate arrangement of the two electrode devices on a washing machine and/or dryer or on the washing drum advantageously the rotation or rotational frequency, the humidity degree of the laundry and/or the amount of laundry situated in the washing drum may be determined. The first electrode device and the second electrode device are preferably capacitively coupled, which drastically increases the degrees of freedom of the electrode arrangement.

The second electrode device may comprise a modulator for the modulation of the alternating electric field irradiated by the first electrode device, in which the alternating electric field modulated by the second electrode device may be led to an evaluation unit of the evaluation circuit, in that the first electrode device may be operated additionally as a receiving electrode. Depending on the field-electrical interactions, for example a capacitance change at the second electrode device, the alternating electric field irradiated by the first electrode device may be modulated in a particularly advantageous way by the modulator. As the alternating electric field is modulated by a modulator, the evaluation unit may distinguish several second electrode devices from each other, in that every modulator amplitude-modulates the alternating electric field for example with another frequency. In this way a second electrode device for humidity determination and another second electrode device for the rotational frequency determination may be provided. Both second electrode devices are preferably capacitively coupled with a common first electrode device.

Further benefits and advantageous embodiments of the invention result from the description, the drawing and claims.

SHORT DESCRIPTION OF THE DRAWINGS

Embodiments of the invention are illustrated in a schematically simplified way in the drawing and in the following description they are explained more in detail. In the drawing.

DETAILED DESCRIPTION OF THE INVENTION

In the following the concept according to the invention of a sensor device for determining the rotational frequency of a rotary body or for determining the amount and/or humidity degree of laundry will be explained more in detail based on the example of a dryer. The concept according to the invention of the rotational frequency determination may be transfer to any type of rotary body, with necessary adaptations to the respective requisites.

A drum of a dryer is mounted on two or four support rollers and driven by a motor by means of a driving belt. According to the invention the rotation of the support rollers can be detected in order to allow a precise statement on the rotation of the drum or on the rotational frequency of the drum.

Figure 1:
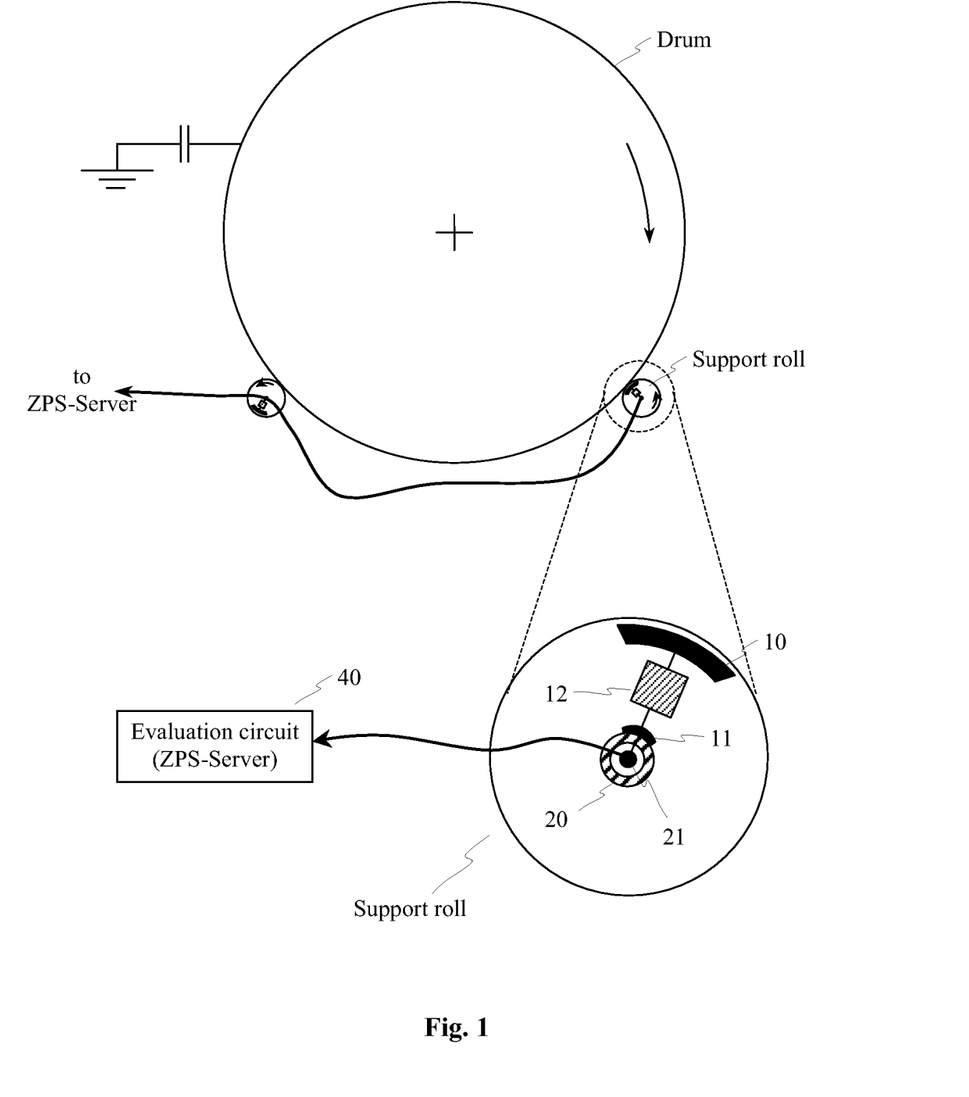
FIG. 1 is a first embodiment of a sensor device according to the invention.

A first embodiment of the sensor device according to the invention is illustrated in FIG. 1.

FIG. 1 shows a drum of a dryer, which is mounted on two rotatable mounting support rollers. FIG. 1 also shows an enlarged view of a support roll in which especially the disposition of the electrodes 10, 11 on the support roll can be seen.

On both support rollers a so-called ZPS-Client is arranged, which consists substantially of the electrodes 10, 11 as well as of a client circuit 12. The electrodes 10, 11 are connected with the client circuit. In FIG. 1 the electrodes 10, 11 are illustrated galvanically connected. The electrodes 10, 11 can be however also capacitively connected with the client circuit, is which makes possible a particularly flexible use of the sensor device according to the invention.

A first electrode 11 is connected with the metallic sliding bearing bush 20 of the support roll. The second electrode 10 is arranged in the form of a ring segment or in the form of a thin crescent-moon shape in the outer area or on the rim of the support roll. The stationary and also metallic rotation axis 21 of the support roll is connected with a server electrode, which is a component of an evaluation circuit (of a so-called ZPS server, see below).

During rotation of the drum the support rollers are set in rotation due to the position of the drum on the support rollers. During rotation of the support rollers the outside electrode 10 cyclically with the rotational frequency of the support roll approaches the drum or again it moves away from the drum. The rotational frequency of the drum is proportional to the rotational frequency of the support rollers, so that from the rotational frequency of the support rollers the rotational frequency of the drum can be derived.

In the approach of the electrode 10 to the drum the capacitive coupling the electrode 10 to mass increases. Conversely the capacitive coupling of the electrode 10 to mass diminishes when the electrode 10 again moves away from the drum.

The ZPS server in its basic structure substantially comprises an oscillator, which generates an alternate current, from which in the following an electric field is generated, and a server electrode, by means of which the generated electric field is emitted or irradiated. Downstream of the oscillator there can be a limiter, for example a resistance, so that possible flowing currents do not rise beyond a certain limit. At this limiter the modulation generated by the Client-circuits can be conducted to an evaluation unit.

The server electrode is connected with the metallic rotation axis of the support roll, so that the rotation axis acts as a server electrode of the ZPS server. The electric field irradiated by the server electrode or by the rotation axis of the support roll is coupled into the electrode 11 of the ZPS client, which also makes possible a power supply of the client circuit 12.

The client circuit 12 comprises a modulator with an oscillator, which oscillates as soon as a sufficient electric field is coupled by the server electrode into the electrode 11. Additionally the client circuit voltage comprises voltage transformers for the conversion of the alternating field taken up by means of the electrode 11 into a DC voltage. With this DC voltage the modulator with the oscillator is operated. According to the input voltage the modulator has a certain level, with which the (coupled) alternate current can be modulated. This level varies for example, if the capacitive environment of the client circuit changes. The level change thus has a change of the level of the alternate current as a consequence, which can be evaluated by the server circuit.

If the exterior electrode 10 approaches the drum, the capacitive coupling to mass increases, which entails that the signal provided by the ZPS server is modified in its amplitude. The electric field is thus amplitude-modulated with the rotational frequency of the support rollers; the amplitude-modulated signal can be detected by the ZPS server and be conducted by it to an evaluation unit. The evaluation unit by means of the amplitude-modulated signal can detect a drum motion or the rotational frequency of the drum.

The amplitude modulation of the electric field is a clear proof of the fact that the drum is moving. Since the rotational frequency of the support roll is proportionally to the rotational frequency of the drum, from the rotational frequency of the support roll, for example by analyzing the outer envelope of the amplitude-modulated signal, the rotational frequency of the drum can be determined.

By the power supply of the ZPS client (substantially consisting of the electrodes 10, 11 and the client circuit 12) with energy by the electric field, which is provided by the ZPS server, an internal power supply for the ZPS client can be dispensed with, which makes possible a particularly compact design of the ZPS client.

If several support rollers are used for determining the rotational frequency of the drum, e.g. on several support rollers each a ZPS client is arranged and the respective metallic rotation axes are connected with the ZPS server or its server electrode, a redundant determination of the rotational frequency of the drum can be done, which can be necessary particularly for safety reasons.

The single ZPS clients are formed in such a way, that the evaluation unit of the ZPS server can separate the amplitude-modulated signal by the ZPS clients and can assign it accordingly to the single ZPS clients. For this on the side of the ZPS clients different arrangements can be provided.

For example the single client-circuits can provide a freewheeling oscillator, which is operated with a different oscillator frequency, so that at the server circuit (in case of several ZPS clients) there is a frequency mixture of various frequencies with different amplitudes, which can be separated e.g. with the help of a Fourier transform accordingly. In this way the rotational frequency of several support rollers can be determined, which allows, besides the redundant construction for safety reasons, also a test of the functionality of the single support rollers, since the single support rollers should rotate with roughly equal rotary frequencies.

Instead of a freewheeling oscillator also a frequency divider can be provided, which divides the frequency of the oscillator signal of the server circuit. Preferably the division ratio in the single ZPS clients is different, so that the single ZPS clients each work with a different frequency amplitude-modulating the alternating field of the server circuit with different frequencies.

Alternatively also a comparator can be provided, which compares an identification number modulated on the carrier signal of the server circuit with an identification number assigned to the ZPS client. In case of correspondence the ZPS client can activate the modulator. After activation the modulation of the carrier signal takes place. The server circuit thus can consult specifically one of several ZPS clients.

Another alternative consists providing a timing element. This ensures that with an appropriate setting of the timing elements at each time only one ZPS client is active.

In case of appropriate arrangement of the electrodes of the ZPS client and the server electrode it can also be ensured that the ZPS client circuit itself switches on or off with the rotational frequency of the support roll (as a rule in the range of some Hz), since the distance of the electrode 11 from the server electrode of the server circuit changes with the rotational frequency of the support roll. The cyclic switching on and off of the client circuit leads to a cyclically present load modulation, which can be recognized by the evaluation unit of the server circuit in the frequency spectrum. From this the rotational frequency of the support roll can be derived.

Of course it is also possible, besides the two support rollers shown in FIG. 1, to provide further support rollers with a corresponding sensor device.

Figure 2:
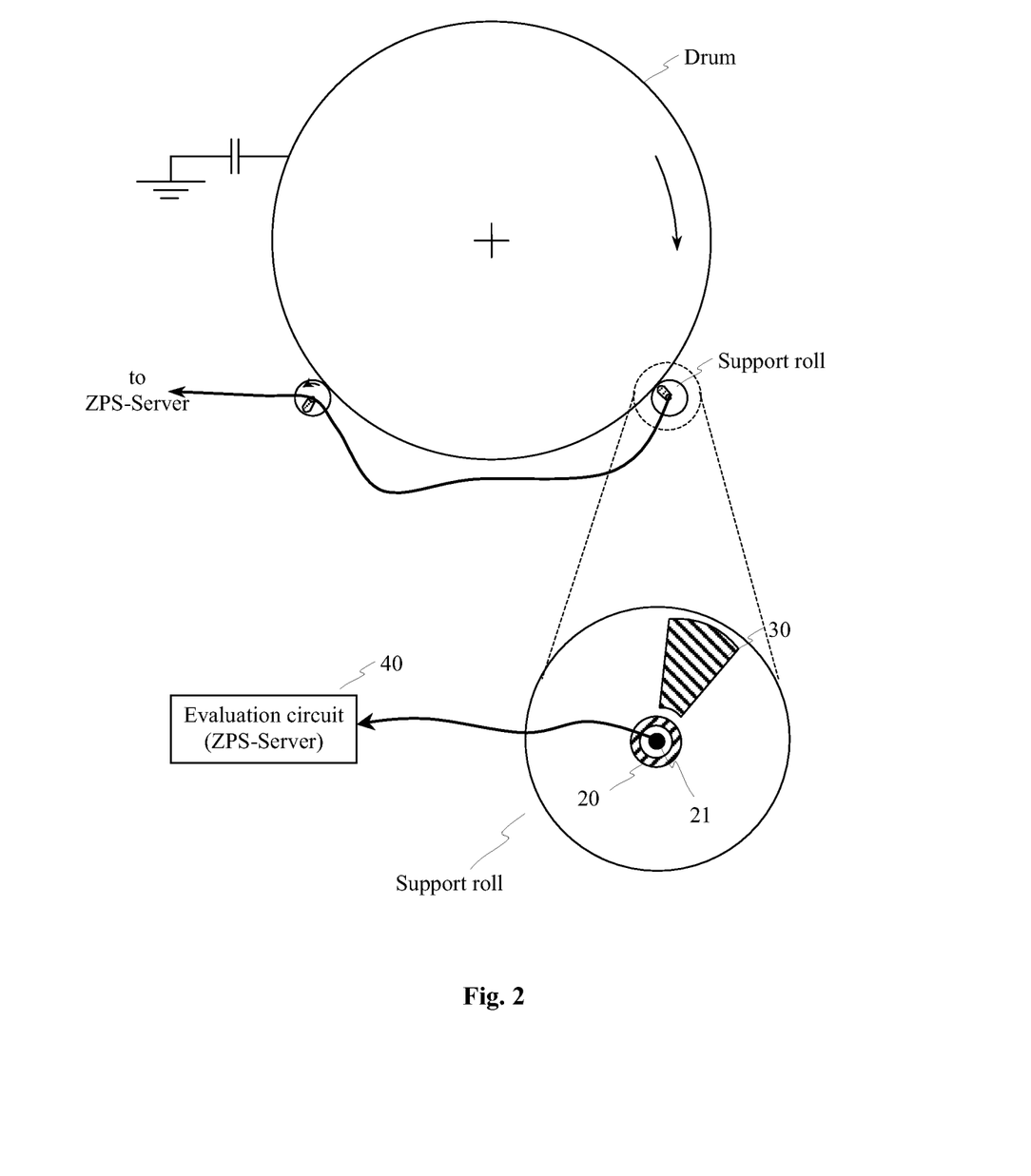
FIG. 2 is a second embodiment of the sensor device according to the invention.

FIG. 2 shows another embodiment of the sensor device according to the invention. Instead of the ZPS clients shown in FIG. 1 here on the support roll an electrode 30 is arranged, which is connected preferably with the sliding bearing bush 20. It is particularly advantageous to arrange the electrode 30 asymmetric relatively to the rotation axis on the support roll. Like in the embodiment according to FIG. 1, also in this embodiment the electrode can be formed as a ring segment or crescent-moon shape. The electrode can consist for example of a conductive varnish layer.

The stationary metallic rotation axis 21 is connected like in the embodiment according to FIG. 1 with the ZPS server or with its server electrode.

Here too the rotation of the drum causes a rotation of the support rollers. During rotation of the support roll the electrode 30 approaches the drum, which entails an increase of the capacitive coupling to mass of the server electrode or of the metallic rotation axis connected with the server electrode. Conversely, thus when the electrode 30 because of the rotation again moves away from the drum, the capacitive coupling to mass of the server electrode or the rotation axis coupled with the server electrode diminishes. The cyclic—with the rotational frequency of the support roll—approach or moving away of the electrode 30 to or from the drum changes the oscillator frequency of the ZPS server. The electric field or the oscillator frequency of the ZPS server is thus frequency-modulated with the rotational frequency of the support roll. This change of frequency of the oscillator is detected by the evaluation unit of the ZPS server and thus can be used for determining the rotational frequency of the support roll or, deduced from it, of the drum. The structure of the ZPS server corresponds substantially to the structure as it has been described in reference to FIG. 1. Also here from the frequency-modulated signal can be derived the rotational frequency of the drum, since the rotational frequency of the drum is proportionally to the rotational frequency of the support roll.

With the solution shown in FIG. 2 especially also measurements with very high rotary frequencies (in the kHz range) can be carried out.

When using two or several support rollers for determining the rotational frequency, the electrodes 30 should be formed or be arranged on the support roll in such a way that there is no anti-phase rotation as for the electrodes 30 arranged on the support rollers, or that the capacitance variations at the electrodes 30 do not compensate mutually, which would entail a minimization of the frequency modulation of the oscillator frequency.

The electrodes 30 thus should be formed in such a way that the capacitance variations on the single support rollers remain asymmetric towards each other, so that an evaluation of the frequency-modulated signal performed by the ZPS server can be done more simply.

An advantageous form of the electrode 30 is illustrated in FIG. 2. The electrode 30 is thin, which entails that the capacitive curves of the two support rollers are particularly asymmetric towards each other.

Also in this embodiment instead of the two support rollers shown in FIG. 2 further support rollers can be equipped with the sensor device according to the invention, making sure that the capacitive curves are symmetrical. In both sensor devices shown in the two embodiments at each time two or several support rollers provided with a sensor device can be connected with a ZPS sensor.

The sensor device according to the invention has the is particular advantage, that it can be realized with minimal intervention into an already existing dryer structure.

Moreover the sensor device according to the invention can be used with any type of rotary body resting on rotatable support rollers for determining the rotational frequency of the rotary body.

If the drum shown in the two embodiments is not coupled with the frame, for example also the cyclic approach of the electrode of the support roll to the (grounded) case of the washing machine or the dryer can be detected.

Especially the sensor device according to the invention can be also used in a ZPS network. A ZPS network substantially comprises a ZPS server of the type mentioned above, to which a number of ZPS clients (like for example the sensor device according to the invention) can be connected. The ZPS server is formed in such a way that it can separate or distinguish the different ZPS clients or the signals provided by the ZPS clients.

Figure 3:
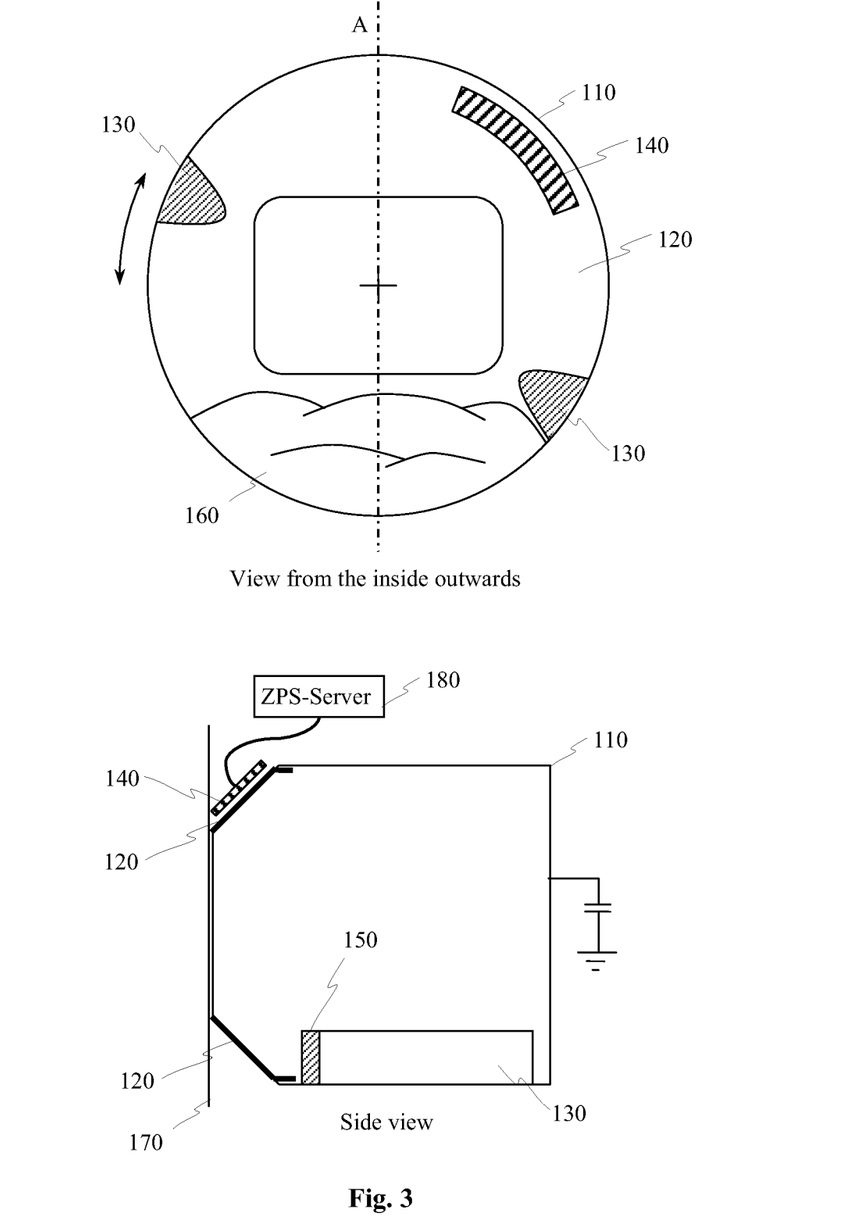
FIG. 3 is the embodiment of a sensor device and its disposition on a washing drum of a dryer according to the present invention.
Figure 4:
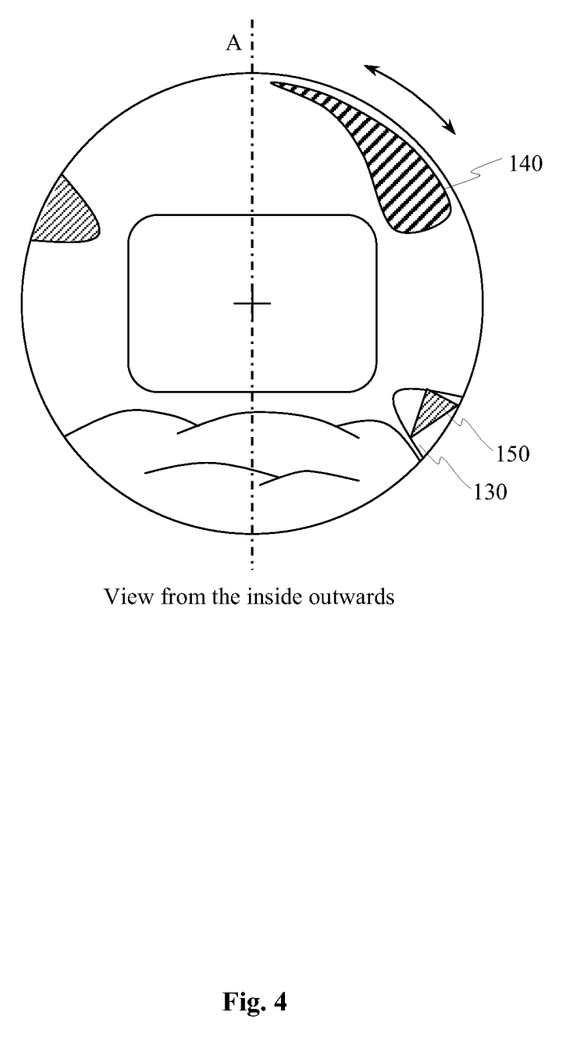
FIG. 4 is a possible embodiment of an electrode or is counter-electrode.

With regard to FIG. 3 and FIG. 4 the sensor device according to the invention is explained based on the example of a washing drum, in which the sensor device is formed in order to detect the amount and/or the humidity degree of the laundry situated in the drum.

FIG. 3 shows a washing drum in the view from the inside outwards (above) as well as in the side view (at the bottom).

The drum 110 inside presents one or several lifters 130, which serve to drag the laundry during the drum rotation. An electrode 140 is arranged in the upper frontal area of the drum. It is situated on the plastic cover 20. By this plastic cover 120 the electrode 140 is isolated from the interior of the drum. The electrode 140 thus is not galvanically coupled with the drum. At the same time the electrode 140, because of the construction of the dryer, is electrically shielded from the environment by the grounded front wall 170 of the dryer.

The electrode 140 has a certain capacitive coupling to environment. The capacitive coupling to environment can be enlarged for example by additional electrode surfaces, or by a larger electrode surface of the electrode 140. In the front elevation of the washing drum shown in FIG. 3 an exemplary form of the electrode 140 can be seen.

Other embodiments than the ring segment shaped form of the electrode shown here are possible. Especially also an asymmetric form, for example an asymmetric form as for the direction of rotation of the drum, is possible, which makes possible a determination of the direction of rotation also in case of an empty drum. Such an embodiment of an electrode is shown in FIG. 4. The electrode 140 is here substantially cuneiform. The signal generated during rotation of the drum in interaction with the counter-electrode (see below) depends on the direction of rotation of the drum, so that from the signal the direction of rotation of the drum can be derived.

Likewise also the counter-electrode 150 can be formed asymmetric, especially asymmetric as for the direction of rotation of the drum. Here too the signal generated during rotation of the drum in interaction with the counter-electrode depends on the direction of rotation of the drum.

In the embodiment shown here the electrode 140 is formed as a server electrode and coupled with a server circuit (ZPS server 180). The ZPS server 180 substantially comprises a freewheeling LC oscillator for generation of an electric field or alternating field, which is irradiated at the server electrode 140 coupled with the ZPS server 180 preferably into the internal of the drum 110. An irradiation of an electric field of the server electrode 140 in an area outside the dryer is avoided because of the grounded front wall 170 or the grounded dryer case. As LC oscillator a serial LC oscillation circuit can be provided with the server electrode 140 as (part of the) capacity in the oscillation circuit, so that also the necessary increase of the electrode voltage at the server electrode 140 is reached.

Of course the server circuit can also consist of a simple circuit, for example a LC-circuit with an oscillator for determining the capacitance change on the electrode. From the measured capacitance change then the amount, the direction of rotation or the humidity degree can be determined, because of the disposition according to the invention of the server electrode and the counter-electrode.

In one embodiment of the sensor device according to the invention the lifter 130 can be electrically conductive. In the embodiment shown in FIG. 3 only the side orientated towards the server electrode 140 of the lifter 130 is electrically conductive. This can be reached for example by the fact that at the side orientated towards the server electrode of the lifter, if this part of the lifter 130 should be formed not electrically conductive, an electrically conductive electrode, for example in the form of a conductive varnish layer or similar, is arranged.

By the rotation of the drum 110 the lifters 130 move past the server electrode 140. In this way the capacitive environment of the server electrode 140 changes, which causes a change of the frequency of the oscillator or of the oscillation circuit of the server circuit. This change of frequency is used for detecting the approach of the lifter 130 or of the electrodes 150 arranged on the lifter 130 towards the server electrode 140.

The result of the evaluation of these changes of frequency of the oscillator depends on the amount and the humidity degree of the laundry situated in the drum 110.

In a rotation of the empty drum the lifters 130 or the electrodes 150 arranged on the lifter 130 go past the server electrode 140. In doing so the oscillator frequency of the server is modulated with the rotational frequency of the drum. From this for example the number of revolutions of the drum 110 can be detected.

If the drum is loaded with wet laundry (however not fully loaded), the capacitive environment or the capacity of the server electrode 140 is changed not only by the lifter or by the electrode 150 arranged on the lifter 130, but also by the laundry carried past the server electrode 140. Also here the oscillator frequency is frequency-modulated with the rotational frequency of the drum. From this again the number of revolutions of the drum can be derived.

Since however the capacitance change or the change of the capacitive environment of the server electrode 140 in the case that wet laundry is carried past the server electrode 140 is greater than in case of an empty drum, also the change of frequency is accordingly greater. Therefore from the change of frequency also the humidity degree of the laundry can be deduced. A change of frequency in the range of a change of frequency in case of empty drum suggests that the laundry in the drum is dry. This is made possible by the fact that the drying process takes place with a certain dynamics and the change of frequency slowly approaches the change of frequency in case of empty drum.

As shown in FIG. 3 in the view from the inside outwards of the drum 110, the server electrode 140 is not arranged symmetrically to the axis A, but asymmetrically to it. Due to this disposition according to the invention of the server electrode 140 the signal form of the frequency-modulated oscillator frequency also depends on the direction of rotation of the drum 110. For example in case of a clockwise rotation of the drum a small quantity of laundry taken along by the lifter falls again down before it reaches or passes the server electrode 140, and thus generates a smaller signal than in case of a counter-clockwise rotation of the drum, where the laundry is carried past the server electrode 140 almost completely.

Since in case of a fully loaded drum no place or little place is available for the laundry taken along by the lifters 130 to fall down again, the frequency-modulated oscillator frequencies with respect to both direction of rotations of the drum are very similar. From the similar signals for both direction of rotations the evaluation unit can detect that the drum 110 is fully loaded with laundry. The amplitude of the frequency-modulated oscillator frequency indicates the humidity degree of the laundry situated in the drum.

In this way a method of measuring the direction of rotation of the drum, the amount and/or of the humidity grade of the laundry in a washing machine or a dryer can be provided, which comprises at least the following steps:

1. The drum is rotated clockwise. In doing so, relative changes of the signal (of the frequency-modulated oscillator frequency) and/or the absolute change of the signal compared to the signal in case of a not loaded drum are detected.

2. Subsequently the drum is rotated counter-clockwise. Also here relative changes of the signal and/or absolute changes of the signal compared to the signal in case of a not loaded drum are detected. The results of the second step are subsequently compared with the results of the first step.

Of course the order of the first both steps can be interchanged, so that in a first step a counter-clockwise drum rotation takes place and in the second step a clockwise drum rotation.

3. In a further step with one or several deposited formula(s) or drawing(s) the necessary variables can be determined like for example amount of the laundry situated in the drum or the humidity degree of the laundry. The concrete formulas and/or drawings to be used in this respect substantially depend on the concrete form of the drum 110. For example the dynamics of the frequency-modulated oscillator frequency can depend on the disposition or the size of the lifters 130 arranged in the interior of the drum. A lifter 130 protruding further into the interior of the drum entails that in a drum rotation much more laundry is carried past the server electrode 140, which leads to a different frequency modulation of the oscillator frequency. The dynamics of the frequency-modulated oscillator signal can especially also depend on the size or the diameter of the drum 110, since in case of a greater drum the laundry taken along by the lifter 130 also in a counter-clockwise rotation can fall down again already preliminary to reaching the server electrode 140, so that for determining the humidity grade of the laundry other reference values must be used than in case of a drum with smaller diameter.

Moreover the method can also present a calibration step, in which the necessary reference values for determining the humidity grade or the amount of the laundry are determined in the drum. This calibration step is carried out preferably with an empty drum, detecting the frequency-modulated oscillator-signal both for a clockwise rotation of the drum and for a counter-clockwise rotation of the drum. The frequency-modulated oscillator signals generated or detected in such a way, which are characteristic for an empty drum rotation, can be stored in a is device provided for this purpose, for example in a non-volatile memory in the server circuit or in the evaluation circuit. The stored signals (reference signals) then can be used in the steps 1) and 2) of the method as comparison signals for determining the absolute change of the current frequency-modulated oscillator signals compared to the signals of a not loaded drum.

If necessary the calibration step can be repeated at any later moment, in order to compensate for example influences due to environment or ageing of the sensor device at least as for the reference signals.

The disposition represented in FIG. 3 of the sensor device according to the invention can be also used for detecting the motion of a child or animal situated in the drum. By the shielding of the server electrode by means of the grounded wall of the device or the grounded case, moreover also a good focusing of the measurement on the changes of the capacity or the capacitive environment of the server electrode only inside the drum is given.

When using a server circuit, to this server circuit still further electrodes or server-electrodes can be connected, in which the further electrodes can serve another purpose than quantification or determining the degree of humidity of the laundry.

In a further embodiment not shown in FIG. 3 and FIG. 4 between the server electrode 140 and the cover 120 a ZPS client can be arranged, as it is described in regard to FIG. 1 and FIG. 2. The alternating electric field irradiated by the server electrode 140 is then coupled into the ZPS client. The ZPS client can be power supplied by means of the coupled field. The modulator of the ZPS client can thus modulate the coupled alternating electric field depending on the capacity at the electrodes of the ZPS client.

It is also possible, instead of providing the electrode 150, to provide a ZPS client on the lifter 130. As soon as the ZPS client arrives in the area of the alternating electric field irradiated at the server electrode 140 and as soon as the alternating electric field coupled into the electrode of the ZPS client is enough to supply the ZPS client with energy, the alternating electric field irradiated at the server electrode 140 is modulated by the ZPS client. In this way changes of the alternating electric field which originate from other influences can be distinguished from changes done by the ZPS client.

The invention claimed is:

1. A sensor device for determining the rotational frequency of a rotary body, with
   a first electrode device fixed to the rotary body;
   a second electrode device fixed to the rotary body; and
   an evaluation circuit for detecting field-electrical interactions, which serve as basis for the determination of the rotational frequency of the rotary body with at least one of the two electrode devices, wherein the first electrode device is operable to communicate with the evaluation circuit and receives a first alternating electric field, the second electrode device is configured as a measurement electrode coupled with the first electrode device, and wherein the second electrode device modulates an alternating electric field transmitted by the second electrode device according to a rotation of the rotary body and communicates the modulation back to the evaluation circuit through the first electrode device.

2. The sensor device according to claim 1, further comprising a control circuit coupled with the first and second electrode device on the rotary body; wherein the control circuit comprises an oscillator configured to generate a second alternating electric field through the second electrode, wherein the second electrode device is configured to modulate the second alternating electrical field, and wherein the second electric field modulated by the second electrode device is transmitted to the evaluation circuit through said first electrode device.

3. The sensor device according to claim 2, wherein the second alternating electric field is frequency-modulatable with the rotational frequency of the rotary body, and wherein from the frequency-modulated electric field the rotational frequency of the rotary body is derivable.

4. The sensor device according to claim 2, wherein the control circuit is power supplied with energy by the first alternating electric field generated by the evaluation circuit.

5. The sensor device according to claim 4, wherein the second electrode device is coupled capacitively to the control circuit.

6. The sensor device according to claim 1 wherein the second electrode device comprises an electrode, which is arranged asymmetrically relatively to the rotation axis of the rotary body.

7. The sensor device according to one of claims 1, wherein the first electrode device is arranged in the area of device rotation axis and the second electrode device is arranged in the outer area of the rotary body.

8. The sensor device according to claim 7, comprising several second electrode devices arranged on the rotary body are distinguishable by the evaluation circuit.

9. The sensor device according to claim 1, wherein the first alternating electric field is forwarded to the second electrode device and is amplitude-modulatable with the rotational frequency of the rotary body and wherein from the amplitude-modulated first electric field the rotational frequency of the rotary body is derivable.

10. The sensor device according to claim 1, wherein the first electrode device is formed by a metallic rotation axis.

11. The sensor device according to claim 1 wherein the rotary body is a drum of a dryer or of a washing machine.

12. The sensor device according to claim 1, wherein the rotary body is at least one support roll for a drum of a dryer or of a washing machine, wherein the rotational frequency of the support roll is used to determined the rotational frequency of the drum.

13. A dryer or washing machine with a drum wherein the drum is mounted on at least one rotatable support roll, with a sensor device according to claim 1 for determining the rotational frequency of the drum, wherein the rotational frequency of the drum is determined based on the capacitive coupling between the second electrode device arranged on the support roll and ground, and wherein the first electrode device is coupled with a metallic rotation axis of the support roll.

14. The sensor device according to claim 1, wherein the first electrode is formed by a rotating metallic shaft, and wherein the evaluation circuit comprises a static third electrode capacitively coupled with the first electrode.

15. The sensor device according to claim 14, wherein a supply electric field generated by the evaluation circuit is fed to the second electrode through the first electrode and amplitude-modulated by the second electrode with the rotational frequency of the rotary body and wherein from the amplitude-modulated electric field the rotational frequency of the rotary body is derivable.

16. The sensor device according to claim 14, comprising a plurality of second and third electrodes arranged on the rotary body and being distinguishable by the evaluation circuit.

17. A method of determining the rotational frequency of a rotary body comprising:
   a) generating an alternating electric field by an evaluation circuit and coupling the alternating electric field into a first electrode device fixed to the rotary body,
   b) coupling the alternating electric field into a second electrode device fixed to the rotary body, wherein the alternating electric field is modulated by rotation of the rotary body,
   c) feeding the modulated electric field back to the evaluation circuit through the first electrode device, and
   c) determining by the evaluation circuit the rotational frequency of the rotary body from the modulated electric field.

18. A sensor device for determining the rotational frequency of a rotary body, with
   a first electrode arranged on the rotary body;
   a second electrode arranged on the rotary body displaced from said first electrode in a radial direction and coupled with the first electrode, wherein the rotary body rotates with respect to an object configured to increase a capacitive coupling of the second electrode to ground when the second electrode approaches the object and wherein the capacitive coupling modulates an electric field generated by the second electrode; and
   an evaluation circuit coupled with said first electrode for detecting said modulation and configured to determine a rotational frequency of the rotary body, wherein the first electrode device is operable to feed back said modulation.

19. The sensor device according to claim 18, further comprising a client circuit on the rotary body connected with the first and second electrode and comprising an oscillator for the generation of the electric field.

20. The sensor device according to claim 19, wherein the client circuit is power supplied with energy through a capacitive coupling with a supply electric field generated by the evaluation circuit and transmitted through a third electrode.

21. The sensor device according to claim 18, wherein the second electrode is arranged asymmetrically relatively to the rotation axis of the rotary body.

22. The sensor device according to claim 21, wherein the electric field is frequency-modulated with the rotational frequency of the rotary body, and wherein from the frequency-modulated electric field the rotational frequency of the rotary body is derivable.

23. The sensor device according to claim 18, wherein the rotary body is a drum of a dryer or of a washing machine.

24. The sensor device according to claim 18, wherein the rotary body is at least one support roll for a drum of a dryer or of a washing machine, wherein the drum forms the object.

25. A method of determining the rotational frequency of a rotary body, comprising:
   a) generating a first alternating electric field by an evaluation circuit and coupling the alternating electric field into a first electrode device fixed to the rotary body,
   b) generating a supply voltage by a control circuit connected with the first electrode device and operating an oscillator with the supply voltage that generates a second alternating electric field which is transmitted by a second electrode device fixed to the rotary body, wherein the second alternating electric field is modulated through rotation of the rotary body,
   c) feeding the modulated second alternating electric field back to the evaluation circuit through the first electrode device, and
   c) determining by the evaluation circuit the rotational frequency of the rotary body from the modulated second alternating electric field.

\* \* \* \* \*